United States Patent [19]

Van Der Schueren et al.

[11] Patent Number: 5,976,605
[45] Date of Patent: Nov. 2, 1999

[54] CHOCOLATE CONTAINING SPRAY DRIED GLUCOSE

[75] Inventors: Freddy Maurits Luc Van Der Schueren, Aalst, Belgium; Mari Cornelis Willem Sölner, Reeuwijk, Netherlands

[73] Assignee: Cerestar Holding B.V., LA Sas van Gent, Netherlands

[21] Appl. No.: 08/938,816

[22] Filed: Sep. 26, 1997

[30] Foreign Application Priority Data

Sep. 26, 1996 [GB] United Kingdom .................. 9620027

[51] Int. Cl.⁶ ..................................................... A23G 1/00
[52] U.S. Cl. ........................................... 426/631; 426/660
[58] Field of Search ..................................... 426/660, 631

[56] References Cited

U.S. PATENT DOCUMENTS

| | | |
|---|---|---|
| 3,895,105 | 7/1975 | Colten et al. . |
| 4,059,460 | 11/1977 | Schollmeier ............................. 127/29 |
| 5,085,877 | 2/1992 | Youcheff ................................. 426/307 |
| 5,474,795 | 12/1995 | Surber ..................................... 426/611 |

FOREIGN PATENT DOCUMENTS

| | | |
|---|---|---|
| 379 023 | 7/1990 | European Pat. Off. . |
| 511 761 | 11/1992 | European Pat. Off. . |
| 1 222 582 | 6/1960 | France . |
| 1 083 636 | 6/1960 | Germany . |
| 28 09 536 | 9/1979 | Germany . |
| 1 274 356 | 5/1972 | United Kingdom . |
| 1 341 963 | 12/1973 | United Kingdom . |

OTHER PUBLICATIONS

The Merck Index, Stecher, editor 1968 Merck & Co, Inc New Jersey 1968 p. 494.

Dialog Abstract, file Foods Adlebra#107248 The Manufacturing Confectioner 65(10) Oct. 1985, pp. 27–34.

Hogenberk 1985 The Manufacturing Confectioner 65(10) pp. 27–34.

*Primary Examiner*—Carolyn Paden
*Attorney, Agent, or Firm*—Pillsbury Madison & Sutro Intellectual Property Group

[57] ABSTRACT

The present invention describes the use of spray dried glucose as sweetening agent in chocolate compositions. The spay dried glucose is used to replace between 5 and 100% of the normal sweetening agent which is sucrose. The spray dried glucose is used in dark, milk and white chocolate. This replacement leads to product having lower viscosity and which is therefore easier to handle.

6 Claims, No Drawings

CHOCOLATE CONTAINING SPRAY DRIED GLUCOSE

TECHNICAL FIELD

The present invention discloses a chocolate composition containing spray dried glucose and chocolates obtained therewith. The invention also describes a method for obtaining chocolates containing the said spray dried glucose.

BACKGROUND OF THE INVENTION

The conventional chocolate composition contains sucrose as a sweetener. The essential components of chocolate are cocoa nib, i.e. the roasted cocoa bean with shell and germ removed, sugar and cocoa butter. Cocoa nib is approximately 55% cocoa butter, the balance being proteins, carbohydrates, tannins, acids etc. The cocoa butter content of the chocolate controls its setting characteristics and largely governs its cost. Different types of chocolate are obtained by varying the ratio of cocoa nib to sugar. The amount of cocoa butter varies according to its application; bitter sweet chocolate has a ratio of nib to sugar of 2:1 while sweet chocolate has a ratio of 1:2.

Nowadays there is a strong interest in reducing the amount of calories contained in chocolate. Two approaches are taken, a reduction of the amount of butter (fat) and/or a reduction of the amount of sugar. The amount of sugar calories is reduced by replacing sucrose with polyols such as maltitol, lactitol, sorbitol, xylitol and erythritol. This replacement often has a double advantage in that not only there is a calorie reduction but also some of the polyols are non-cariogenic.

Finally sucrose is perceived as being too sweet resulting in the masking of the typical chocolate taste replacement of sucrose with a less sweet product such as polyols enhances the chocolate taste. Erythritol is further used for its cooling effect.

British Patent GB 1,274,356 discloses a process for producing a partially solidified sugar syrup which comprises the addition of a fine particulate reducing sugar to a syrup saturated or supersaturated with reducing sugar and allowing the syrup to set. Spray dried dextrose is mentioned as one of the possible seeding crystals. The sugar syrup obtained is suitable for general domestic use in much the same way as a jam or honey.

United States Patent U.S. Pat. No. 3,895,105 relates to the finding that the incorporation of minor amounts of hydroxylated lecithin within a chocolate product used for the coating of edible confectionery or bakery products largely reduces moisture loss.

European patent application EP 0 511 761 relates to a new sweetening composition comprising erythritol, sorbitol and a glucose oligomer of DE 10 to 30 and which is suitable as an instant pie filling or a bakery cream. The glucose oligomer may be in spray dried form.

British Patent GB 1,341,963 relates to edible compositions comprising a dry, powdery mixture which can be mixed with water, milk or another liquid, to give an "instant" dessert of the sorbet or ice cream type. Spray dried dextrose is mentioned as one of the components of the composition.

Investigations have also been performed to replace (part of the) sucrose in certain applications with dextrose. It was found that dextrose monohydrate could not be used in the chocolate production process due to the vapour development at high conching temperatures German Patent application DE 1,083,636 discloses the addition of dextrosehydrate after the conching step. Anhydrous dextrose, that is dried dextrose, is much to expensive for application in chocolate.

SUMMARY OF THE INVENTION

The present invention discloses that spray dried glucose (dextrose) can be used as a partial or complete replacement of sucrose in chocolate.

The present invention discloses a chocolate composition containing cocoa butter, cocoa liquor and/or whole milk powder and a sweetening agent wherein the sweetening agent contains between 5 and 100% of spray dried glucose preferably between 20 and 100%. The rest of the sweetening agent is selected from the group consisting of sucrose, polyols and intense sweeteners and mixtures thereof.

The present invention further discloses a chocolate composition having the mentioned sweetening agent composition and further characterised in that the amount of fat is between 25 and 32%.

The present invention further discloses a milk, dark or white chocolate containing as a sweetening agent from 5 to 100% spray dried glucose and from 0 to 95% of a sweetening agent selected from the group consisting of sucrose, polyols and intense sweeteners and mixtures thereof. The composition of the present invention is further used as a topping or filling for confectionery products.

The present invention further discloses that known methods for obtaining the finished chocolate are used with the present composition.

DETAILED DESCRIPTION

The preparation of chocolate involves four stages. In the first stage the ingredients are mixed together this mixing which should be very thorough may involve grinding and rubbing to obtain a smooth fluid paste. Addition of the ingredients may be sequentially and also may comprise repeated partial addition. After mixing the chocolate composition is conched.

In this second stage the mixture is subjected to mechanical working to give the chocolate a fuller and more homogenous flavour. Other ingredients such as flavours, lecithin and extra cocoa butter may be added at this stage if needed. The third stage is called tempering. In this stage nuclei are provided in the liquid chocolate composition to facilitate the rapid crystallisation of the fat content on cooling. The final appearance of the chocolate, the texture and keeping properties depend upon correct tempering stage conditions. After tempering the chocolate may be cast into moulds or it may be enrobed to obtain a coated confectionery product.

Extensive discussions of the methods and the possible variations have been described in for example in Chocolate, cocoa and confectionery: Science and Technology. B. W. Minifie, 3rd ed, Van Nostrand Reinhold, New York (1989).

The dry conching step has been described in European patent EP 489515.

The present invention describes the replacement of sucrose by from 5 to 100% spray dried glucose, preferably from 20 to 100%, more preferably from 20 to 80%. The spray dried glucose may be used as a sucrose replacer in dark, milk and white chocolate.

The spray dried glucose is obtained by spray drying glucose syrups which contain more than about 95% of dextrose the rest being made up of sugars having a higher dp (degree of polymerisation) such a maltose, maltotriose etc. Spray dried glucose has a sweetness factor which is between 70 and 80% of that of sucrose so that the taste of the chocolate is improved upon replacement of the sucrose due to a lowering of the masking effect.

The spray drying results in a product that still contains some water however the water is released at high conching temperatures and the spray dried glucose is used in the normal chocolate preparation process without the need to modify this process. The chocolate characteristics are not negatively affected by the spray dried glucose. It is shown that the viscosity characteristics are even improved. Spray dried glucose is readily prepared from glucose syrups using standard spray drying equipment. Spray dried glucose is also available from Cargill under the name SPRAY SWEET.

An added advantage of the application of this spray dried product is that it is much cheaper than sucrose.

Dark chocolate is normally characterised by the presence of cocoa liquor and butter. In milk chocolate the amount of cocoa liquor is lowered, the amount of cocoa butter is increased and whole milk powder is added. In white chocolate cocoa liquor is absent and the amount of whole milk powder is somewhat higher.

Standard relative amounts of the different components of the different types of chocolate and ranges within which these amounts can vary are well-known to the man skilled in the art.

Without departing from the present invention it is possible to use the spray dried glucose in combination with a reduced amount of fat i.e. chocolate having a total fat content of less than 32% (w/w) values as low as 28% or even 25% have been used.

It is also possible to use the spray dried glucose in combination with polyols such as xylitol, erythritol, lactitol, sorbitol, maltitol and Palatinit™ and/or intense sweeteners.

The product then contains as sweetening agent sucrose 0–95% and 5–100% spray dried glucose. Part of the sucrose or spray dried glucose may be replaced with polyols or other suitable sweeteners including intense sweeteners such as aspartame.

It is further shown that the replacement of the sucrose with spray dried glucose results in a product having characteristics similar or better then those of the standard sucrose-containing chocolate. The process steps employed for obtaining the normal chocolate end product are applicable without modification.

It is further demonstrated that there is a decrease in viscosity of the product which results in easier moulding as the moulds are easier to fill and entrapped air escapes more readily from the hot chocolate mass. This lowering of the viscosity makes possible a lowering of the amount of fat which is used to obtain a product having the same viscosity. This in effect means that the product contains less fat and still has the same viscosity. This viscosity is important if chocolate figures are made. In order to be capable of filing the moulds generally more fat is added to reduce the viscosity. After replacement of sucrose with the spray dried glucose this is not necessary anymore. This viscosity effect is not observed when sucrose is replaced with polyols.

The same viscosity effects are observed when dark, white or milk chocolate is used.

EXAMPLE 1

Use of Spray Dried Glucose in Dark Chocolate

The following compositions were used to prepare dark chocolate according to the classical preparation process.

|  | Standard | Spray dried glucose | |
| --- | --- | --- | --- |
|  |  | 20% | 100% |
| Cocoa liquor | 42% | 42% | 42% |
| Cocoa butter | 13.5 | 13.5 | 13.5 |
| Sucrose | 44 | 35 | — |
| Spray dried glucose | — | 9 | 44 |
| Lecithin | 0.48 | 0.48 | 0.48 |
| Flavour Vanilla | 0.02 | 0.02 | 0.02tz,1/32 |

Mixing temperature: 40° C.
Conching system: one step (dry conching) at 70° C. for 20 hours.

Spray dried glucose sold under the name SPRAY SWEET™ (available from Cargill) was used.

During mixing of the ingredients workability was comparable between standard and 20% and 100% replacement of sucrose.

During conching no difference in behaviour was observed. There was no viscosity increase of the chocolate mass which could have been due to possible moisture pick-up and/or free crystal water.

The standard tempering conditions (29–31° C.) were used resulting in a stable end product. Small tablet—and stick moulds were filled with the tempered chocolate and cooled during a short period. A sufficiently firm texture was obtained to allow removal from the moulds without breaking or deformation.

The chocolate mass viscosity was determined according to the Casson method the following results were obtained.

|  | Yield value (Pa) | Plastic viscosity (Pas) |
| --- | --- | --- |
| Standard (100% sucrose) | 4.14 | 1.48 |
| 20% spray dried | 4.29 | 1.65 |
| 100% spray dried | 3.37 | 1.78 |

20% replacement of sucrose by spray dried glucose gave no difference in viscosity. 100% replacement has a positive effect on the yield viscosity. A lower viscosity improves the flowability which results in a better and easier filling of the moulds. Also in this case the entrapped air is released more easily.

The reported results show that technically spray dried glucose can be used to replace sucrose.

EXAMPLE 2

Use of Spray Dried Glucose in Milk Chocolate

The following compositions were used to prepare milk chocolate according to the classical preparation process.

|  | Standard | Spray dried glucose 20% | Spray dried glucose 100% |
| --- | --- | --- | --- |
| Cocoa liquor | 11% | 11% | 11% |
| Cocoa butter | 25.5 | 25.5 | 25.5 |
| Whole milk powder | 22.0 | 22.0 | 22.0 |
| Sucrose | 41 | 33 | — |
| Spray dried glucose | — | 8 | 41 |
| Lecithin | 0.48 | 0.48 | 0.48 |
| Flavour Vanilla | 0.02 | 0.02 | 0.02 |

Mixing temperature: 40° C.
Conching system: one step (dry conching) at 70° C. for 20 hours.

Spray dried glucose was used.

During mixing of the ingredients workability was comparable between standard and 20% and 100% replacement of sucrose.

During conching no difference in behaviour was observed. There was no viscosity increase of the chocolate mass which could have been due to possible moisture pick-up and/or free crystal water.

Further conditions were as in Example 1. The final product showed improved viscosity characteristics.

EXAMPLE 3

Use of Spray Dried Glucose in White Chocolate

The following compositions were used to prepare white chocolate according to the classical preparation process.

|  | Standard | Spray dried glucose 20% | Spray dried glucose 100% |
| --- | --- | --- | --- |
| Cocoa liquor | — | — | — |
| Cocoa butter | 26.5 | 26.5 | 26.5 |
| Whole milk powder | 25.0 | 25.0 | 25.0 |
| Sucrose | 48 | 38.5 | — |
| Spray dried glucose | — | 9.5 | 48 |
| Lecithin | 0.5 | 0.5 | 0.5 |

Mixing temperature: 40° C.
Conching system: one step (dry conching) at 70° C. for 20 hours.

Spray dried glucose was used.

During mixing of the ingredients workability was comparable between standard and 20% and 100% replacement of sucrose.

During conching no difference in behaviour was observed. There was no viscosity increase of the chocolate mass which could have been due to possible moisture pick-up and/or free crystal water.

Further conditions were as in Example 1. The final product showed improved viscosity characteristics.

What we claim is:

1. A chocolate composition containing cocoa butter, cocoa liquor and/or whole milk powder and a sweetening agent wherein the sweetening agent contains between 5 and 100% of spray dried glucose.

2. A chocolate composition according to claim 1 wherein the sweetening agent contains between 20 and 100% of spray dried glucose.

3. A chocolate composition according to claim 1 or 2 further comprising from 0 to 95% of a sweetening agent selected from the group consisting of sucrose, polyols and intense sweeteners and mixtures thereof.

4. A chocolate composition according to claim 1 wherein the amount of fat is between 25 and 32 percent.

5. A milk, dark or white chocolate obtained with the chocolate composition of claim 1 and containing as a sweetening agent from 5 to 100% spray dried glucose and from 0 to 95% of a sweetening agent selected from the group consisting of sucrose, polyols and intense sweeteners and mixtures thereof.

6. A confectionery product, topped or filled with a chocolate composition according to claim 1.

* * * * *